Patented Aug. 17, 1943

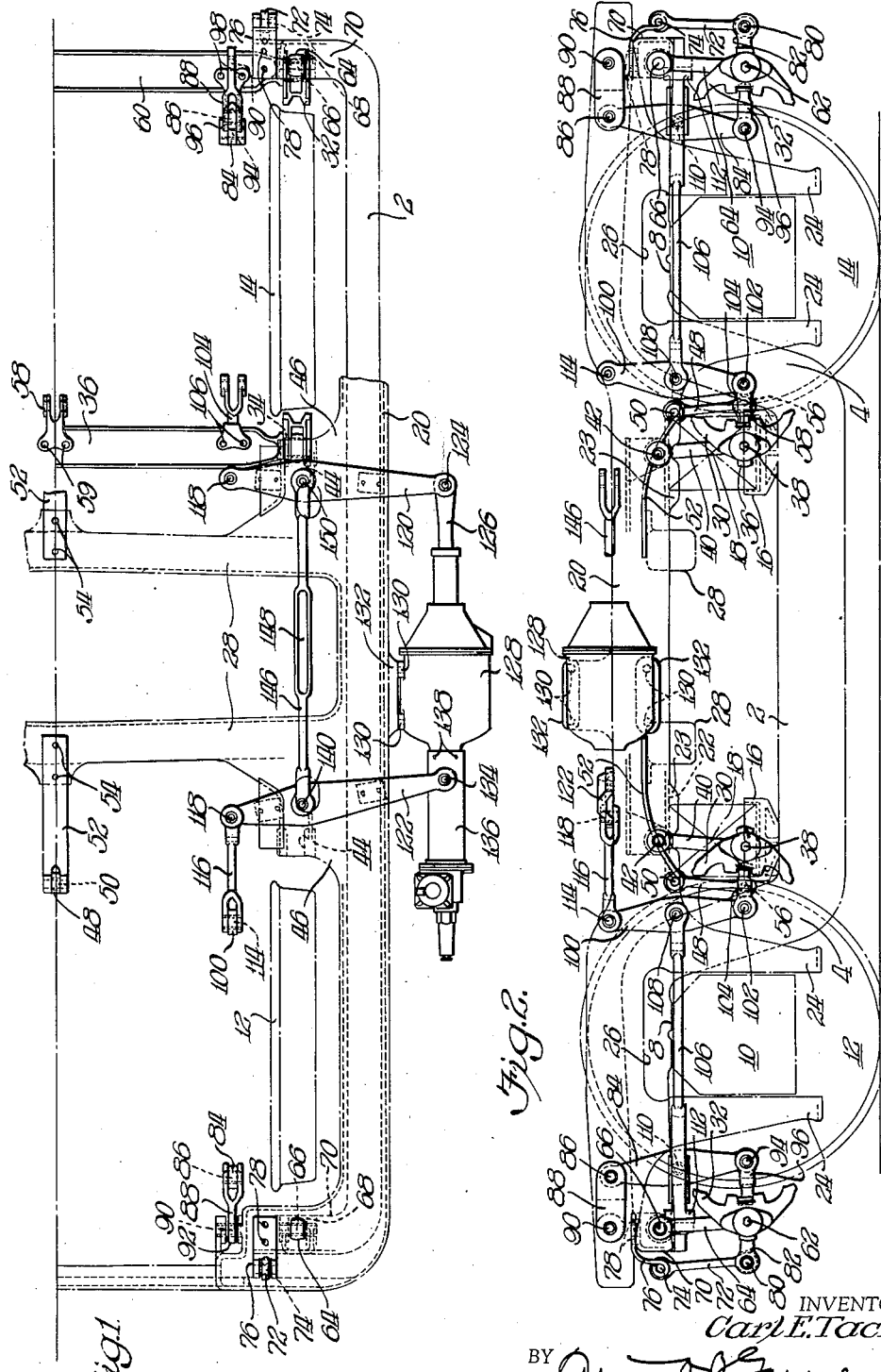

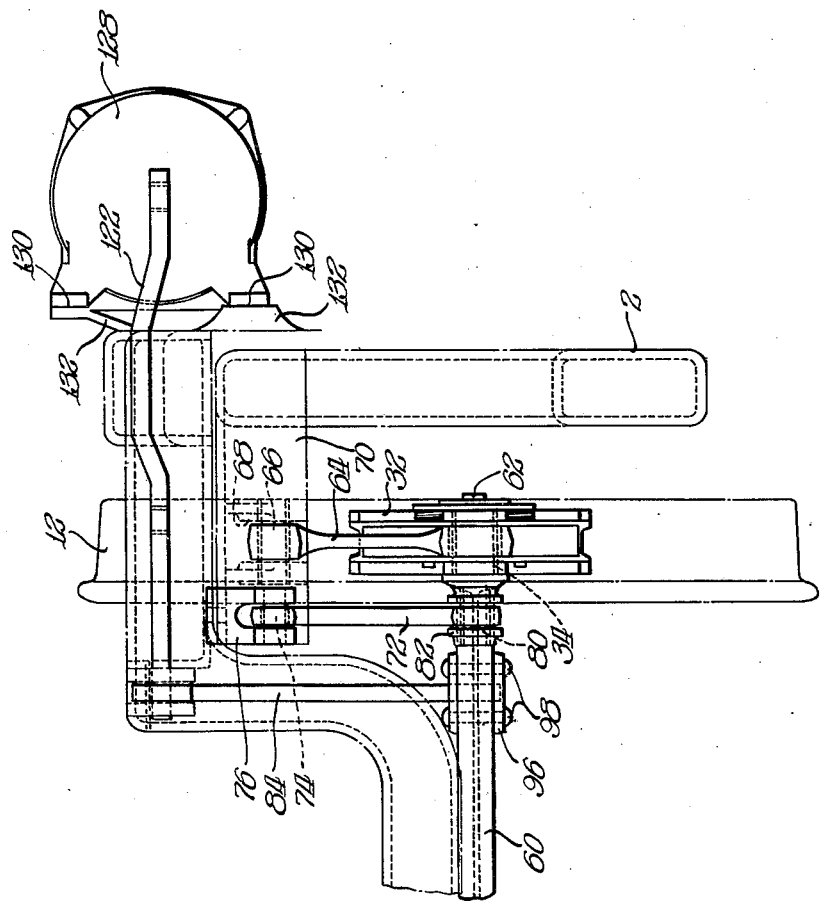

2,327,157

UNITED STATES PATENT OFFICE 2,327,157

BRAKE ARRANGEMENT

Carl E. Tack, Chicago, Ill., assignor to American Steel Foundries, Chicago, Ill., a corporation of New Jersey Application December 26, 1941, Serial No. 424,433

23 Claims. (Cl. 188—56)

My invention relates to improvements in brake rigging of the beam type for railway car trucks and having associated therewith that type of brake known as the clasp brake in which brake shoes are applied at opposite sides of each car wheel.

It is an object of my invention to provide a brake mechanism of the so-called beam type in which the brake cylinder or other actuating means is mounted on or carried by a truck frame.

It is a further object of my invention to provide such a brake mechanism in which certain of said brake beams are supported from the equalizers of a railway car truck.

Still another object of my invention is to limit tipping of said truck caused by retardation thereof during actuation of the brake mechanism by supporting brake beams intermediate the associated wheels from a frame member so that forces applied to said member through the associated brake hangers will oppose the forces tending to tip the truck, the brake beams outwardly of the wheels being supported from equalizers upon which the frame member is resiliently mounted, said last-mentioned beams being so supported in order that forces therefrom will be transmitted to the equalizers during actuation of the brake mechanism and will not be transferred to the frame member thus counteracting the forces operating through the hangers associated with the beams intermediate the wheels.

My invention contemplates a car truck comprising a novel form of equalizer member having inwardly directed brackets at the ends thereof, said brackets being provided with jaws from which are supported brake hangers associated with certain of the brake beams utilized in my novel arrangement.

In the drawings

Figure 1 is a top plan view of a railway car truck embodying my novel brake arrangement, only one-half of the truck being shown, inasmuch as it is similar at opposite sides thereof, and the upper frame member being partially cut away in order more clearly to illustrate the brake arrangement thereunder.

Figure 2 is a side view of the structure shown in Figure 1, all of the upper frame member being shown therein, and Figure 3 is an end elevation taken from the left as seen in Figures 1 and 2.

In each of said figures certain details may be omitted where they are more clearly seen in other views.

Describing the structure in detail, the truck comprises a bottom side frame member or equalizer generally designated 2 having a substantially horizontal mid-portion of rectangular section with which may be formed integral end portions 4, 4 formed and arranged for engagement as at 6, 6 with the tops of associated journal boxes 10, 10 within which may be received in usual manner the journal ends of spaced wheel and axle assemblies 12 and 14. Each of the end portions 4, 4 may comprise an integral inturned bracket as hereinafter more fully described. The horizontal mid-portion of the equalizer member 2 may be formed at each end thereof with a spring seat 16 on which may be positioned a plurality of coil springs (diagrammatically indicated at 18, 18) affording a support for the superposed frame member generally designated 20, the side portions of said frame member being afforded spring seats at 22, 22, said seats being flanged over as at 23, 23. The frame member 20 also comprises the pedestal jaws 24, 24 defining journal openings 26, 26 at the ends of said side frame, within which openings may be positioned the journal boxes 10, 10 in usual manner. The upper frame member 20 comprises integrally formed spaced transoms 28, 28 serving as a usual means of support for a swing bolster (not shown) which may be confined therebetween and which serves as a bearer for the supported car body, and each transom supports a balance hanger bracket in a manner hereinafter more fully described.

At either side of each wheel and axle assembly are the inner brake heads 30, 30 and the outer brake heads 32, 32, said heads supporting brake shoes (not shown) for frictional engagement with the peripheries of the associated wheels. Each of the brake heads 30 and 32 is engaged as at 34 (Figure 3) in usual manner with the trunnion end of the associated brake beam, said beams being supported in a manner hereinafter more fully described. The inner beams 36, 36 associated with the inner brake heads 30, 30 are secured as at 38, 38 to the lower ends of hangers 40, 40, the upper ends of which are pivotally mounted as at 42, 42 in the jaws 44, 44 formed on the gussets which are integrally formed with the transoms and each side portion of the upper frame member at their junctures. Combination balance and safety hangers 48, 48 are secured as at 50, 50 to balance hanger brackets 52, 52 secured as at 54, 54 to the transoms 28, 28 at the longitudinal center line of the truck, said hangers 48, 48 being pivotally connected as at 56, 56 to the fulcrums 58, 58 (Figure 1, right) secured as at 59, 59 to the inner beams 36, 36. The outer beams 60, 60 associated with the outer brake heads 32, 32 are secured as at 62 to the lower ends of hangers 64, 64, the upper ends of which are pivotally connected as at 66, 66 to the jaws 68, 68 on the inturned brackets 70, 70 integrally formed on the ends of the equalizer 2 and well above the axle level. Combination safety and balance hangers 72, 72 are secured as at 74, 74 to balance hanger brackets 76, 76 secured as at 78, 78 to the inboard ends of the brackets 70, 70 said hangers 72, 72 being connected at the lower ends thereof as at 80, 80 to the fulcrums 82, 82 formed on the outer beams 60, 60.

The dead truck levers 84, 84 are fulcrumed at their upper ends as at 86, 86 from the fulcrum brackets 88, 88 pivotally connected as at 90, 90 to the jaws 92, 92 formed at the ends of the frame member 20, and said levers 84, 84 are connected at the lower ends thereof as at 94, 94 to the fulcrums 96, 96 secured as at 98, 98 (Figure 1, right) to the outer beams 60, 60. The live truck levers 100, 100 are connected at the lower ends thereof as at 102, 102 to the fulcrums 104, 104 secured as at 106, 106 to the inner brake beams 36, 36. The truck levers associated with respective wheels are connected by pull rods 106, 106 pivotally connected as at 108, 108 to the live truck levers intermediate the ends thereof and pivotally connected as at 110, 110 to the dead truck levers intermediate the ends thereof, each pull rod being provided with slack adjusted means designated 112 and of well known form. The upper ends of the live truck levers 100, 100 are pivotally connected as at 114, 114 to the links 116, 116 (Figure 1, left), the opposite ends of which are connected as at 118, 118 to the end of the live cylinder lever 120 and to the inner end of the dead cylinder lever 122 respectively. The outer end of the live cylinder lever is connected as at 124 to the piston rod 126 of the cylinder unit 128 which is supported as at 130, 130 from the cylinder pads 132, 132 formed on the upper frame member 20. The dead cylinder lever 122 is connected at its outer end as at 134 to the automatic slack adjusted device 136 secured as at 138, 138 to the cylinder unit 128, and said dead cylinder lever is pivotally connected intermediate its ends as at 140 to the pull rod 146, the opposite end of which is pivotally connected at 150 to the live cylinder lever 120 intermediate its ends, said pull rod 146 being of annular form and flattened as at 148 intermediate its ends in order to afford clearance for the associated bolster (not shown).

In operation the cylinder unit 128 through the piston rod 126 moves the live cylinder lever 120 in a counter-clockwise direction thereby actuating the brake rigging at one end of the truck through the live truck lever 100 associated with the live cylinder lever 120. At the same time the live cylinder lever by means of the pull rod 146 causes the dead cylinder lever 122 to move in a clockwise direction, thus actuating the brake rigging at the opposite end of the truck through the live truck lever 100 connected to the dead cylinder lever 122, as will be clearly apparent to those skilled in the art.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a railway car truck, a frame member, spaced supporting wheel and axle assemblies, equalizers supported from said assemblies, resilient means mounted on said equalizers and supporting said frame member, power means secured to said frame member, and brake rigging comprising brake beams supported outwardly of each assembly from said equalizers, brake beams supported intermediate said assemblies from said frame member, interconnected live and dead truck levers at opposite sides of each assembly and connected to respective beams, and an operative connection between said power means and said live truck levers, said last-mentioned connection comprising live and dead cylinder levers connected at corresponding ends thereof to said power means, connected intermediate their ends to each other, and connected at opposite corresponding ends thereof to respective live truck levers.

2. In a railway car truck, a lower frame member, an upper frame member resiliently supported thereon, spaced supporting wheel and axle assemblies, power means and brake beams intermediate said assemblies supported from one of said members, brake beams outwardly of said assemblies supported from the other of said members, interconnected live and dead truck levers at opposite sides of each assembly and associated with respective beams, and an operative connection between said power means and said live truck levers, said operative connection comprising interconnected live and dead cylinder levers connected at corresponding ends thereof to opposite ends of said power means and connected at opposite corresponding ends thereof to said live truck levers.

3. In a railway car truck, a frame member, brackets pivotally connected thereto, spaced supporting wheel and axle assemblies, equalizers supported from said assemblies at opposite sides of the truck and affording a resilient support for said frame member, power means supported on said member and brake rigging comprising brake beams supported outwardly of said assemblies from said equalizers, brake beams supported intermediate said assemblies from said frame member, interconnected live and dead truck levers at opposite sides of each assembly and connected at corresponding ends thereof to respective beams, said dead truck levers being pivotally connected at the opposite ends thereof to respective brackets, and said live truck levers having an operative connection with said power means.

4. In a railway car truck, a frame member, spaced supporting wheel and axle assemblies, equalizers supported from said assemblies at opposite sides of the truck and affording a resilient support for said frame member, power means secured to said frame member, and brake rigging comprising brake beams supported outwardly of said assemblies from said equalizers, brake beams supported intermediate said assemblies from said frame member, interconnected live and dead truck levers at opposite sides of said assembly and connected to respective beams, and an operative connection between said power means and said live truck levers.

5. In a railway car truck, a frame member, spaced supporting wheel and axle assemblies, equalizers supported from said assemblies, resilient means mounted on said equalizers and supporting said frame member, a cylinder secured to said frame member, and brake rigging comprising brake beams supported at opposite sides of each assembly from said frame member and from said equalizer respectively, interconnected live and dead truck levers at opposite sides of each assembly and connected to respective beams, interconnected live and dead cylinder levers connected at corresponding ends thereof to said cylinder and at opposite corresponding ends thereof to said live truck levers.

6. In a railway car truck, a frame member, spaced supporting wheel and axle assemblies, equalizers supported from said assemblies and affording a resilient support for said frame member, power means secured to said frame member, and brake rigging comprising brake beams supported at opposite sides of each assembly from said equalizers and from said frame member respectively, interconnected live and dead truck levers connected to said beams, and an operative connection between said power means and said live truck levers.

7. In a railway car truck, a lower frame member, an upper frame member resiliently supported thereon, spaced supporting wheel and axle assemblies, power means secured to one of said frame members, and brake rigging comprising brake beams intermediate said assemblies and supported from said last-mentioned frame member, brake beams outwardly of said assemblies and supported from the other of said frame members, interconnected live and dead truck levers at opposite sides of each assembly and connected to respective beams, and an operative connection between said power means and said live truck levers.

8. In a railway car truck, a frame member, spaced supporting wheel and axle assemblies, equalizers supported from said assemblies at opposite sides of the truck and affording a resilient support for said frame member, inturned brackets outwardly of said assemblies formed on the ends of said equalizers, and brake rigging comprising brake beams supported from said brackets, brake beams intermediate said assemblies and supported from said frame member, interconnected live and dead truck levers associated with respective beams, and power means associated with said live truck levers.

9. In a railway car truck, a frame member, spaced supporting wheel and axle assemblies, equalizers supported from said assemblies at opposite sides of the truck and affording a resilient support for said frame member, power means secured to said frame member, and brake rigging comprising brake beams at opposite sides of each assembly and supported from said frame member and from said equalizers respectively, actuating means associated with said beams, and safety means comprising hangers supported from said frame member at the center line of the truck and connected to respective beams.

10. In a railway car truck, a lower frame member, resilient means seated thereon, an upper frame member mounted on said resilient means, spaced supporting wheel and axle assemblies, inwardly directed brackets formed on the ends of said lower frame member, brake hangers mounted at the upper ends thereof on said brackets and connected at the lower ends thereof to brake beams, brake beams intermediate said assemblies and supported from said upper frame member, interconnected live and dead truck levers associated with respective beams, and power means associated with said live truck levers.

11. In a brake arrangement for a railway car truck, a lower frame member, an upper frame resiliently mounted thereon, spaced supporting wheel and axle assemblies, brake rigging comprising brake beams, certain of said beams being supported from one of said members and the other of said beams being supported from the other of said members, operating means associated with said beams, said operating means comprising interconnected live and dead truck levers connected to respective beams, and power means associated with said live truck levers.

12. In a railway car truck, a wheel and axle assembly, an unsprung frame member supported therefrom, another frame member resiliently supported on said unsprung member, friction means at opposite sides of said assembly, certain of said means being supported from the unsprung member and other of said means being supported from the other member, and actuating means for said friction means.

13. In a railway car truck, a lower frame member affording a seat for resilient means, an upper frame member mounted on said means, spaced supporting wheel and axle assemblies, brake rigging comprising brake beams supported at opposite sides of each assembly from said upper member and said lower member respectively, interconnected live and dead truck levers associated with respective beams, and power means associated with said live truck levers.

14. In a railway car truck, a lower frame member, resilient means seated thereon, an upper frame member mounted on said means, spaced supporting wheel and axle assemblies, and brake rigging comprising brake beams intermediate said assemblies and supported from one of said members, brake beams outwardly of said assemblies and supported from the other of said members, and operating means associated with said beams.

15. In a railway car truck, a frame member, spaced supporting wheel and axle assemblies, equalizers supported from said assemblies and affording a resilient support for said frame member, and brake rigging comprising brake beams intermediate said assemblies and supported from said member, brake beams outwardly of said assemblies and supported from said equalizers, and actuating means associated with said beams.

16. In a brake arrangement for a railway car truck, a lower frame member, an upper frame member resiliently mounted thereon, spaced supporting wheel and axle assemblies, brake rigging comprising brake beams, certain of said beams being supported from one of said members and the other of said beams being supported from the other of said members, and operating means associated with said beams.

17. In a railway car truck, spaced lower frame members, an upper frame member resiliently mounted thereon, spaced supporting wheel and axle assemblies, brake rigging comprising brake beams at opposite sides of each assembly, certain of said beams being supported from said upper member and other of said beams being supported from said lower member, and power means mounted on said upper member and operatively associated with said beams.

18. In a railway car truck, a wheel and axle assembly, an unsprung frame member supported therefrom, another frame member resiliently supported on said unsprung member, friction means associated with said assembly, certain of said means being supported from the unsprung member, and other of said means being supported from said resiliently supported member, and actuating means associated with said friction means.

19. In a railway car truck, a lower frame member, resilient means thereon, an upper frame member mounted on said means, spaced supporting wheel and axle assemblies, and brake rigging comprising friction means intermediate said assemblies and supported from one of said members, friction means outwardly of said assemblies and supported from the other of said members, and operating means associated with said friction means.

20. In a railway car truck, a frame member, spaced supporting wheel and axle assemblies, equalizers supported from said assemblies and affording a resilient support for said frame member, and brake rigging comprising friction means intermediate said assemblies and supported from said member, friction means outwardly of said assemblies and supported from said equalizers, and actuating means associated with said friction means.

21. In a brake arrangement for a railway car truck, a lower frame member, an upper frame member resiliently supported thereon, spaced supporting wheel and axle assemblies, brake rigging comprising brake hangers, certain of said hangers being supported from one of said members, and other of said hangers being supported from the other of said members, friction means supported from said hangers and associated with said assemblies, and operating means associated with said friction means.

22. In a brake arrangement, a vehicle frame comprising a sprung and an unsprung member, a supporting wheel and axle assembly comprising a rotatable member adapted to be braked, and friction means for braking said member, certain of said friction means being hung from the sprung member and other of said friction means being hung from the unsprung member.

23. In a railway car truck, spaced supporting wheel and axle assemblies, a frame member resiliently supported from said assemblies, and clasp brake rigging associated with said assemblies, said rigging comprising brake hangers hung from said member and operative to transmit torque forces thereto to oppose the tipping of said member due to retardation of the truck, and said clasp brake rigging also comprising brake hangers hung from unsprung portions of said truck.

CARL E. TACK.